United States Patent [19]

Slansky

[11] Patent Number: 4,617,559
[45] Date of Patent: Oct. 14, 1986

[54] OPERATOR ALARM SYSTEM

[76] Inventor: Allan Slansky, 913 Charlotte Rd., Plainfield, N.J. 07060

[21] Appl. No.: 646,635

[22] Filed: Aug. 31, 1984

Related U.S. Application Data

[63] Continuation-in-part of Ser. No. 379,439, May 18, 1982, abandoned.

[51] Int. Cl.⁴ .............................................. G08B 21/00
[52] U.S. Cl. ..................................... 340/576; 340/575
[58] Field of Search ............... 340/576, 575; 248/74.3, 248/74.4

[56] References Cited

U.S. PATENT DOCUMENTS

| | | | |
|---|---|---|---|
| 3,049,090 | 8/1962 | Bergen | 340/575 |
| 4,219,800 | 8/1980 | Le Viness | 340/576 |
| 4,485,375 | 11/1984 | Hershberger | 340/576 |
| 4,540,979 | 9/1985 | Gerger et al. | 340/576 |

Primary Examiner—Glen R. Swann, III
Attorney, Agent, or Firm—Rohm & Monsanto

[57] ABSTRACT

An alarm system formed by a wrapper includes an energy source, an operator grip-pressure-controlled switch, an orientation responsive switch, and an audio resonator. The wrapper is secured to an operator controllable member, such as a steering wheel, by being folded over the member upon itself and secured using, for example, a fabric fastener interlock. In operation, the user places his hand upon the pressure control switch included within the wrapper. When the grip of the user becomes relaxed, for example, due to inattention or fatigue, the switch operates the resonator and an alarm is sounded. The orientation responsive switch controls disablement and enablement of the alarm system in response to displacement of the operator controllable member.

12 Claims, 7 Drawing Figures

OPERATOR ALARM SYSTEM

RELATIONSHIP TO OTHER PATENT APPLICATIONS

This patent application is a continuation-in-part of my copending patent application Ser. No. 379,439, filed May 18, 1982, now abandoned.

BACKGROUND OF THE INVENTION

This invention relates to an operator alarm system, and, more particularly, to a driver alarm system which is intended to operate when a driver becomes fatigued or inattentive.

In the operation of mechanisms where alertness is important to insure safety, it is important to provide a warning system when the operator becomes inattentive. Such is the case with the operation of an automobile. If a driver becomes inattentive because of fatigue or drowsiness, it is important to indicate that the physical condition of the driver does not permit continued operation of the vehicle in a safe manner.

A number of safety systems, particularly for automobiles, have been proposed. Illustrative examples include U.S. Pat. Nos. 2,172,116; 2,187,761; 2,199,060; 2,237,607; 2,575,926; 2,848,712; 3,026,503; 3,266,032; 3,559,206; 3,585,626; 3,703,217; 3,811,116; 3,946,288; 4,104,621 and 4,210,905. The foregoing devices are largely cumbersome and complex. Many of them are difficult to operate. Still others require costly modifications to the operating unit.

Accordingly, it is an object of the invention to facilitate operator alertness. A related object is to facilitate alertness for the operators of motor vehicles.

Another object of the invention is to alert an operator when inattentive or drowsy. A related object is to alert the operator of a motor vehicle to a physical condition which interferes with the safe operation of a motor vehicle.

Still another object of the invention is to achieve a universal alerting system which can be adapted to a wide variety of control surfaces. A related object is to achieve a universal control system which can be used on steering wheels as well as on control members of widely differing configurations.

A further object of the invention is to achieve simplification and compactness in an operator alarm system. A related object is to achieve simplification and compactness in a motor vehicle alarm system.

SUMMARY OF THE INVENTION

In accomplishing the foregoing and related objects, the invention provides an alarm system that is containable within a wrapper that is, in turn, releasably securable to a control member, for example, a sterring wheel. The releasable wrapper constitutes an envelope that can include a source of energy, a pressure control switch, an amplifier, and a resonator. The latter is connectable to the energy source through the amplifier when pressure is released from the switch.

In accordance with one aspect of the invention, the alarm is provided by a plural element resonator in which flexible elements can be moved from an initial coplanar position. Where the resonator members are comparatively small, they can be fabricated from relatively rigid materials. In the case of an automobile alarm system, the resonator elements advantageously are in the form of elongated plates having major axes approximately alignable with the circumferential axis of the associated steering wheel.

In accordance with another aspect of the invention, the energy source advantageously is a battery pack fabricated from flexible constituents as a pouch that is includable within the wrapper and assumes the configuration of the control member. In the case of an alarm system for an automobile steering wheel, the battery pouch is able to partially envelope the steering wheel when the wrapper is in position.

In accordance with a still further aspect of the invention, the alarm system includes an amplifier on a flexible base that can adopt, at least in part, the configuration of the control member. The flexible base desirably includes a transistor and resistive elements connected to the various transistor electrodes. In one configuration the emitter of the transistor is connectable directly to one pole of the battery pack and to one element of the resonator through a first resistor. The base of the transistor is connectable to the same element of the resonator through a second resistor, while the collector is connectable to the opposite pole of the battery pack through a third resistor. The collector is simultaneously directly connectable to a second element of the resonator. When the transistor is of the p-n-p type, the emitter is connected to the positive pole of the battery pack and the collector is connectable to the negative pole of the battery pack.

In accordance with still another aspect of the invention, the pressure control switch is of the strip type on one or more flaps of the wrapper. The pressure switch desirably activates the alarm system when pressure is removed from it.

DESCRIPTION OF THE DRAWINGS

Other aspects of the invention will become apparent after considering several illustrative embodiments taken in conjunction with the drawings in which.

DETAILED DESCRIPTION

Figure 1A:
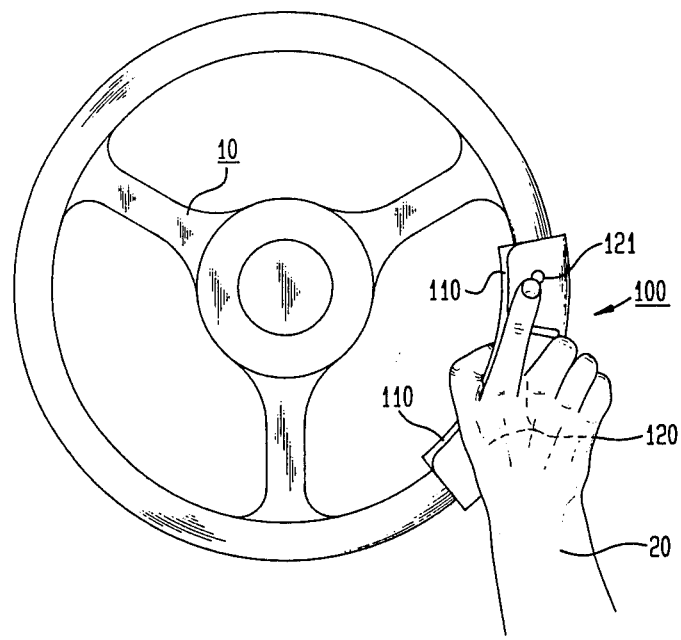
FIG. 1A is a plan view showing an alarm system in accordance with the invention being wrapped around the steering wheel of a motor vehicle.
Figure 1B:
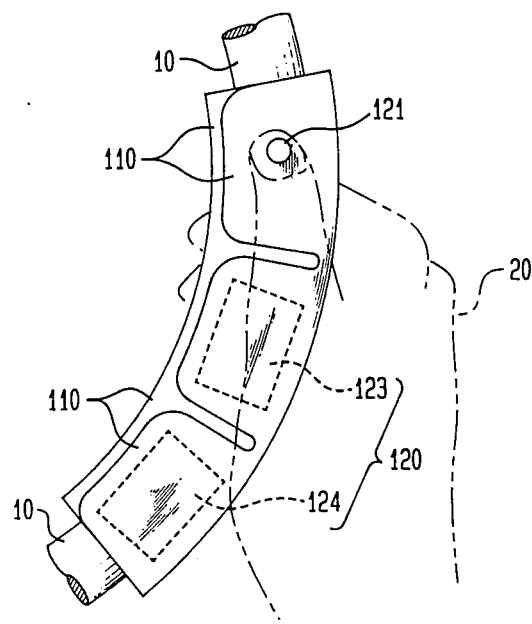
FIG. 1B is an enlarged view of a portion of FIG. 1A showing additional details of the alarm system.

As illustrated in FIG. 1, an alarm system 100 in accordance with the invention is included within a wrapper 110 that envelopes a section of a control member, for example, a steering wheel 10 of a motor vehicle. The wrapper 110 is positioned on the steering wheel 10 in the customary grip of the user. As shown in FIG. 1, a hand 20 of the user grips the wrapper and applies pressure to a control switch 120. It will be understood that the wrapper 110 may occupy any other position that is convenient for the user and that the control over the switch 120 is a matter of choice.

If for any reason the user should become inattentive and his operation of the control switch 120 is interrupted, an alarm will be sounded as described below.

Figure 2:
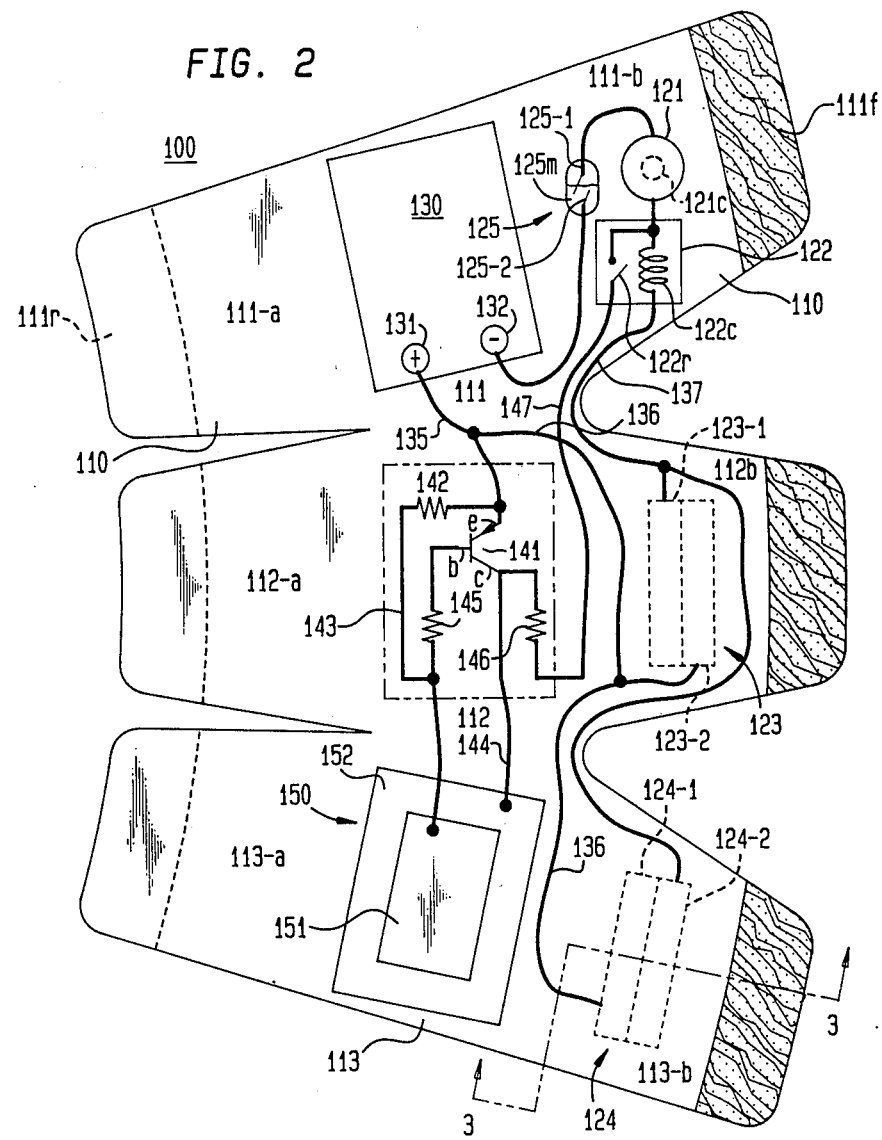
FIG. 2 is a plan view of the alarm system of FIG. 1 after having been unwrapped from the steering wheel.

As shown in FIG. 2, the wrapper 110 can be removed from the steering wheel 10 and placed in an essentially flat position in preparation for repositioning of the wrapper on some other portion of the steering wheel 10 or upon some other control member.

The wrapper 110 is shown with three sections 111, 112, and 113. Each section includes side flaps which are foldable upon one another. For example, the first section 111 has side flaps 111-a and 111-b. Similarly, the second section 112 has side flaps 112-a and 112-b. Finally, the third section 113 has side flaps 113-a and 113-b. The side flaps are trimmed with materials which can be releasably secured to one another. Suitable materials are the fastening and receiving strips f and r on the various flaps, e.g., fastening strip 111-f on the upper side of flat 111-b and the receiving strip 111-r on the underside of the flap 111-a. The fastening and receiving strips desirably are of the type marketed and sold under the tradename "VELCRO".

The first section 111 includes a power source 130 which illustratively is in the form of a battery pack with with direct current terminals 131 and 132. The pack 130 desirably is of flexible material, being of the type employed, for example, in instant photography. It will be appreciated that the source 130 may be a standard 9 volt transistor cell and that the first section would then include a pouch in which the transistor cell would be positioned.

The central section 112 of the wrapper 110 includes an amplifier 140. This amplifier desirably in formed with a single transistor 141 with an emitter e connected to the positive terminal 131 of the battery pack 130 by a lead 135. A first resistor 142 extends from the junction of the emitter e with the lead 135 by a lead 143 to an alarm 150. The transistor 141 also includes a collector c which is connected to the alarm by a lead 144. In addition a second connection is made to the collector c from a switch member 122 through a second resistor 146 by way of a lead 147. The base b of the transistor 141 is joined to the lead 143 by way of a third resistor 145.

The alarm 150 is located in the third section 113. The alarm 150 desirably is a resonator of known type with elements 151 and 152 which in this specific illustrative embodiment have rectangular configurations. The element 151 is an inner member that is connected to the emitter and the base of transistor 141 via resistors 142 and 145, respectively. Element 151 is surrounded by the second element 152, which is of different material in order to provide the desired resonance effect, or alarm sound, when energized with respect to the first member 151. It is connected by the lead 144 to the collector of transistor 141 of the amplifier 140.

Figure 3:
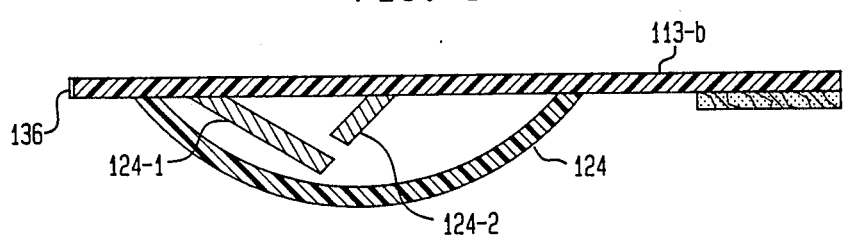
FIG. 3 is a sectional view of a pressure control switch for use in the alarm system of FIG. 2.

Control over the alarm system is exercised by a set of switch components 121, 122, 123, 124 and 125. The first component 121 is of the standard push button variety with a depressible center contact 121c that desirably protrudes through the underside of the flap 111-b which becomes the outer side when the wrapper is secured in position about, for example, a steering wheel. The push button switch 121 is in position where it can be operated by the thumb of the user. After the wrapper is positioned as desired about the steering wheel the circuit of the alarm system is activated by depressing the center control button 121c. This closes a path from the negative pole 132 of the battery pack 130 to the second control element 122. Completion of the circuit requires closure of the third or fourth switch element 123 or 124. The latter switches are included in pods with elongated strips. The corresponding strips for the first pod switch 123 are the members 123-1 and 123-2. Similarly the elongated strips for the second pod switch 124 are the members 124-1 and 124-2. A cross section of the illustrative pod switch 124 is shown in FIG. 3.

When the wrapper 110 is in position about the steering wheel and the wheel is gripped through the wrapper by the hand of the user, either the pod switch 123 or 124 will have its strip elements in contact because of the pressure applied by the hand of the user. If the push button switch 121 has been operated, current will flow from the battery pack 130 in an auxiliary circuit that includes the leads 136 and 137 through a coil 122c of the second switch member 122. This causes a reed 122r to be drawn away from its associated contacts. If the grip of the operator becomes relaxed, the strip elements of the pod switch 123, or the pod switch 124, will separate, terminating the current flow to the coil 122c and allowing the reed switch 122r to relax against its associated contacts and energize the amplifier 140. This in turn activates the resonator 150 and produces the desired alarm.

By operating push button control switch 121, the operator can disable the alarm system deliberately, for example, when he is making a 180° turn, or when he undertakes a deliberate maneuver which requires that he temporarily release his grip from the wrapper.

In addition, a mercury switch 125 is included to automatically deactivate the circuit when a turn in the range from 90° to 270° is made. This causes the mercury 125m that normally closes adjoining contacts 125-1 and 125-2 to uncover one and then both contacts, and bring about the desired disablement.

It will be appreciated that various modifications can be made in the alarm system 100 according to the constituent components that are employed. Thus, although it is preferable to employ printed transistor elements for the amplifier 140, as well as printed circuit components for the resistors 142, 145 and 146, it will be appreciated that regular circuit elements including cylindrical resistors and chip transistor elements may also be employed since these components are available in miniaturized form which does not detract from the utility of the wrapper 110.

Similarly, although the alarm 150 is desirably formed by a resonator with rectangular elements 151 and 152, such as is known to be produceable by thin film foils which are separated by a dielectric film, in order to realize a relatively planar electrostatic speaker, i.e. resonator, it will be appreciated that the alarm 150 may also be provided by a miniaturized conventional alarm element such as that now commonly employed with modern telephones. Such an alarm takes the form of a button with a cylindrical housing that contains a conventional resonator element. When it is desired to employ a planar resonator, the rectangular element 151 is made from a suitable metallic film, such as aluminum and the adjoining rectangular element is also of a suitable metallic film such as a metallic oxide of aluminum or other resonating metal. The desired electrostatic effect between the two resonator elements 151 and 152 is provided by a dielectric film which can be an ordinary plastic film such as polyethylene or polyethylene terephthallate.

It has been noted earlier that although a flexible battery is desirable for the pack 130, a standard battery such as the conventional 9-volt transistor cell which is in common use for household fire alarms and radios, may also be employed. Similarly the voltage of the included cell or source 130 may be varied in accordance with the particular materials that are to be employed,. A conventional cell of the AA type with an output voltage of about 1.5 volts may also be employed in which case the included circuit components are adjusted accordingly.

Figure 4:
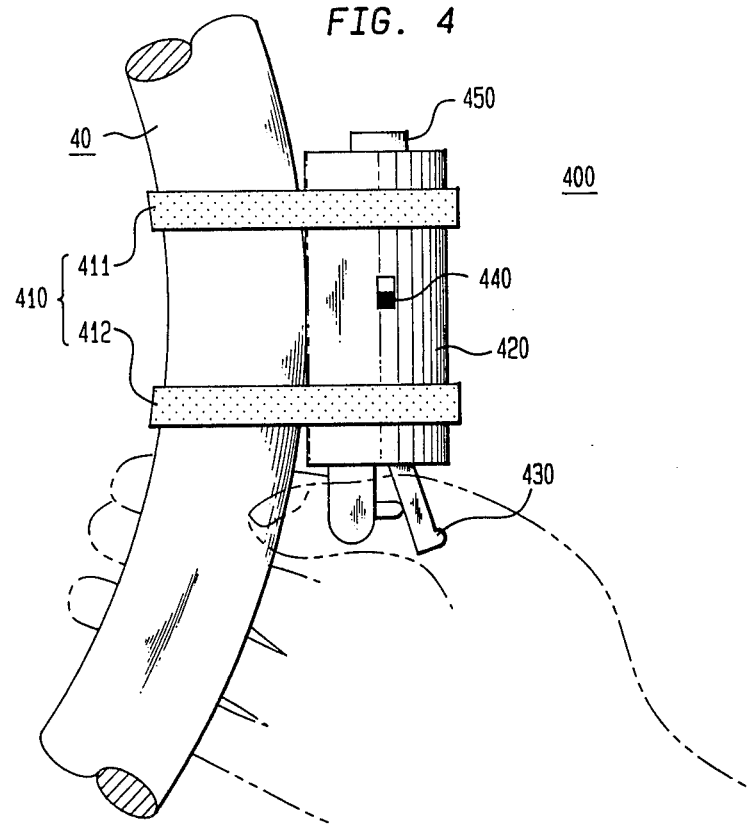
FIG. 4 is a plan view showing an alternative alarm system in accordance with the invention wrapped around the steering wheel of a vehicle.

An alternative alarm system 400 in accordance with the invention is shown in FIG. 4. The system 400 includes a housing 420 which is positioned on a steering wheel 40 by a wrapper 410 which is in two sections 411 and 412. As in the case of the wrapper 110 of FIG. 1 each section includes side flaps which are foldable upon one another. Thus the first and second sections, 411 and 412, have side flaps which are not shown in this figure and which can be releasably secured to one another, as described hereinabove with respect to FIG. 2.

In addition each of the wrapper sections 411 and 412 is attached to the housing 420. The attachment may be temporary or semipermanent. In the latter case the section 411 is advantageously cemented to the housing 420 along three side surfaces. Similarly the section 412 is also cemented to the housing 420. Alternatively an attaching strip of the "Velcro" type may be secured to the housing 420 and the sections 411 and 412 adhered to it.

As indicated in FIG. 4 one side of the housing 420 abuts a steering wheel 40 and the operator grips the wheel 40 below the housing 420 and applies pressure to a control switch 430. The housing 420 also includes an ON-OFF switch 440 and a resonator 450.

Figure 5A:
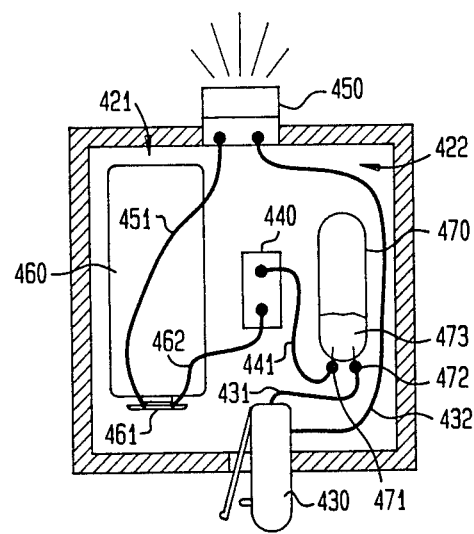
FIG. 5A is a cross sectional view of the alarm unit of FIG. 4 showing internal constituents.

The various components of the housing 420 are illustrated relative to one another in the sectional view of FIG. 5A. The housing 420 is divided into two internal compartments 421 and 422. The first compartment 421 is used for a power source 460 such as a 9-volt transistor battery. The power source is employed in conjunction with a terminal cap 461 with a lead 462 that extends to the switch 440. From the switch 440 a lead 441 extends to a control switch 470. As illustrated in FIG. 5A the control switch 470 includes two internal contacts 471 and 472 that are immersed in a mercury pool 473 when the wheel is in the position as shown in FIG. 4 with the housing 420 in a substantially upright position relative the direction of motion of the associated vehicle. When the operator makes a left hand turn or otherwise maneuvers the wheel 40 through a large angle not associated with temporary loss of control, the mercury pool 473 uncovers contacts 471 and 472 and disables the alarm.

The contact 472 of the control switch 470 extends by a lead 431 to the operator control switch 430. From the latter a lead 432 extends to one pole of the resonator 450. The circuit is completed by a lead 451 that extends from the second pole of the resonator 450 to the battery can 461.

Figure 5B:
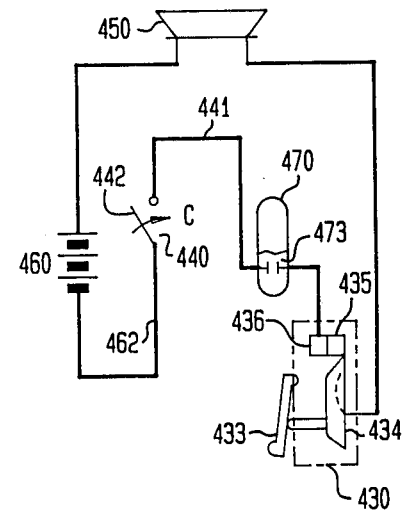
FIG. 5B is a wiring and schematic diagram for the alarm unit of FIGS. 4 and 5A.

The electrical schematic corresponding to FIGS. 4 and 5A is shown in FIG. 5B. It is to be noted that the resonator 450 is of the type that is energizable directly from a battery source, such as a 9-volt transistor battery without any intermediate application. The switch 430 which prevents energization of the resonator 450 after the circuitry has been initiated by closure of the switch 440 by moving the blade 442 in the direction indicated by the arrow C to produce a continuous path from the lead 462 to the lead 441, is in its open state when pressure is applied as shown in FIG. 4. Such pressure at the toggle 433 flexes the spring 434 and opens the contacts 435 and 436. When the driver becomes inattentive and releases pressure from the toggle 433 it moves to the position shown in FIG. 5B and brings about the desired closure of the contacts 435 and 436. This produces a complete circuit for the flow of current from the battery 460 through the closed switch 412, the mercury pool control switch 470, the operator control switch 430 to and through the resonator 450. The resonator 450 as explained before is advantageously of the kind employed with portable smoke alarms and modern telephones and may be used with a wide variety of battery packs ranging from 1.5 volts DC to and including 9-volts DC and various combinations and sizes of the standard 1.5 volt DC battery pack.

While various aspects of the invention have been set forth by the drawings and specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. An alarm system for warning of reduced alertness on the part of an operator of a machine, the alarm system being of the type which is installed on a control member of the machine, the control member being displaceable over a substantially predeterminable displacement path in response to manipulation by the operator whereby the machine is controlled in response to the displacement, the alarm system having at least one electrode for receiving energy, the alarm system further comprising:
   electrically actuatable alarm means for producing an alarm indication in response to receiving energy conducted thereto from the electrode;
   first interruptor means having conductive and non-conductive states for controlling said conduction of said energy to said electrically actuatable alarm means;
   a manipulatable element responsive to the operator for controlling said first interruptor means, whereby said conductive and non-conductive states of said first interruptor means are selectable in response to a manipulation condition of the operator, said manipulation condition being in response to the alertness of the operator; and
   second interruptor means electrically interposed between the electrode and said electrically actuatable alarm means, said second interruptor means having conductive and non-conductive states which are selectable in response to the location of the control member along the predetermined displacement path for controlling conduction of said energy to said electrically actuatable alarm means in response to the displacement of the control member.

2. The alarm system of claim 1 wherein there is further provided switch means for selectably disabling and enabling the alarm system.

3. The alarm system of claim 1 wherein there is further provided coupling means for coupling said manipulatable element to said first interruptor means whereby a portion of said manipulatable element is arranged in the vicinity of the control member where it is gripped by the operator.

4. The alarm system of claim 1 wherein said second interruptor means comprises a mercury switch having conductive and non-conductive states responsive to the orientation of said mercury switch.

5. The alarm system of claim 4 wherein said mercury switch is orientable so as to enable the alarm system when the control member is arranged within a predetermined nominal region of the predeterminable displacement path.

6. The alarm system of claim 5 wherein the control member is a steering wheel of a motor vehicle and said predetermined nominal region corresponds to a position of said steering wheel wherein said motor vehicle is controlled to travel along a substantially straight path.

7. The alarm system of claim 1 wherein there is further provided detachable coupling means for mounting the alarm system to the control member, said detachable coupling means comprising fabric fastening and receiving members.

8. An alarm system for warning of reduced alertness on the part of an operator of a machine, the alarm system being of the type which is installed on a control member of a machine, the control member being displaceable over a substantially predeterminable displacement path in response to manipulation by the operator, whereby the machine is controlled in response to the displacement, the alarm system further comprising:

grip monitor means responsive to a force of the operator; and control element monitor means for enabling the alarm system only during such times as the control element is within a predetermined nominal range of the predeterminable displacement path.

9. The alarm system of claim 8 wherein said grip monitor means comprises switch means having a manipulatable member in the vicinity of the control member.

10. The alarm system of claim 9 wherein said control element monitor means comprises a mercury switch having conductive and non-conductive states selected in response to the orientation of the alarm system.

11. The alarm system of claim 8 wherein there is further provided switch means for disabling the alarm system when it is desirable to render the alarm system inoperable indefinitely.

12. A method of controlling an alarm for warning of reduced alertness on the part of an operator of a machine, the method comprising the steps of:

defining a predetermined region of travel of a control member wherein the alarm is enabled, the alarm being disabled when the control member is manipulated outside of said predetermined region; and requiring a gripping force to be applied by the operator to a portion of the alarm, while said control member is within said predetermined region of travel, whereby activation of the alarm is prevented.

* * * * *